United States Patent
Trachewsky et al.

(10) Patent No.: US 8,478,336 B2
(45) Date of Patent: *Jul. 2, 2013

(54) BASEBAND / RFIC INTERFACE FOR HIGH THROUGHPUT MIMO COMMUNICATIONS

(75) Inventors: Jason A. Trachewsky, Menlo Park, CA (US); Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,267

(22) Filed: Aug. 20, 2012

(65) Prior Publication Data

US 2012/0307876 A1    Dec. 6, 2012

Related U.S. Application Data

(63) Continuation of application No. 13/215,404, filed on Aug. 23, 2011, now Pat. No. 8,249,651, which is a continuation of application No. 12/554,956, filed on Sep. 7, 2009, now Pat. No. 8,014,820, which is a continuation of application No. 11/527,854, filed on Sep. 27, 2006, now Pat. No. 7,587,222.

(60) Provisional application No. 60/735,502, filed on Nov. 11, 2005.

(51) Int. Cl.
*H04M 1/00*    (2006.01)

(52) U.S. Cl.
USPC ........ 455/553.1; 455/101; 455/272; 370/278; 375/219

(58) Field of Classification Search
USPC ................. 455/101, 132, 133, 137, 266, 269, 455/272, 273, 552.1, 553.1; 370/276, 277, 370/278; 375/219
See application file for complete search history.

(56) References Cited

U.S. PATENT DOCUMENTS

| | | | |
|---|---|---|---|
| 7,587,222 B2* | 9/2009 | Trachewsky et al. | ...... 455/553.1 |
| 8,014,820 B2* | 9/2011 | Trachewsky et al. | ...... 455/553.1 |
| 8,249,651 B2* | 8/2012 | Trachewsky et al. | ...... 455/553.1 |
| 2006/0205380 A1* | 9/2006 | Sugar et al. | ................... 455/333 |

* cited by examiner

*Primary Examiner* — Nhan Le
(74) *Attorney, Agent, or Firm* — Garlick & Markison; Bruce E. Garlick

(57) ABSTRACT

Analog signal paths are utilized between a baseband processor and a radio front end to support high throughput communications for a multiple in multiple out radio transceiver that support communications over two or more antennas. Specifically, analog differential I and Q path communication signals are exchanged between a radio front end core and a baseband processor to maximize throughput capacity for high data rate signals. Along the same lines, the impedances of traces and the interface are matched to reduce I/Q imbalance.

20 Claims, 11 Drawing Sheets

FIG. 5 MIMO transceiver 250

BASEBAND / RFIC INTERFACE FOR HIGH THROUGHPUT MIMO COMMUNICATIONS

CROSS-REFERENCE TO PRIORITY PATENT APPLICATIONS

The present U.S. Utility Patent Application claims priority pursuant to 35 U.S.C. §120, as a continuation, to U.S. Utility application Ser. No. 13/215,404, filed Aug. 23, 2011, to be issued as U.S. Pat. No. 8,249,651, which is a continuation of U.S. Utility application Ser. No. 12/554,956, filed Sep. 7, 2009, and now issued as U.S. Pat. No. 8,014,820, which is a continuation of U.S. Utility application Ser. No. 11/527,854, filed Sep. 27, 2006, now issued as U.S. Pat. No. 7,587,222, which claims priority pursuant to 35 U.S.C. §119(e) to U.S. Provisional Application Ser. No. 60/735,502, filed Nov. 11, 2005, all of which are incorporated herein by reference in their entirety and made part of the present Patent Application for all purposes.

BACKGROUND

1. Technical Field

The present invention relates to wireless communications and, more particularly, to integrated circuit radio front end circuitry.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bipolar circuitry, allowing for large signal swings and linear transmitter component behavior. Therefore, many legacy baseband processors employ analog interfaces that communicate analog signals to and from the radio processor.

Typically, a radio front end processor includes digital to analog converters that it uses to convert an outgoing signal received from a baseband processor to an analog signal prior to performing filtering, upconversion and amplification for transmission from an antenna. Such designs are known and have been successfully used for many years. New design requirements, however, are making it difficult to employ old and known techniques. For example, new high throughput wireless local area network access points desirably must transmit data at very high rates. To support transmission of high data rate signals, the baseband processor is required to employ high sample rates and to conduct a large amount of data over a high speed serial digital bus. For example, to support desired high throughput rates for a multiple input multiple output (MIMO) radio, it may be necessary to transmit data at a 12 Gigabit/second data rate.

From a radio front end integrated circuit's perspective, receiving, processing, and transmitting such high data rate serial data may be problematic. What is needed, therefore, is a circuit and method for supporting high throughput communications and more specifically, an interface between a baseband/MAC integrated circuit and a radio front end integrated circuit that supports high throughput communications.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
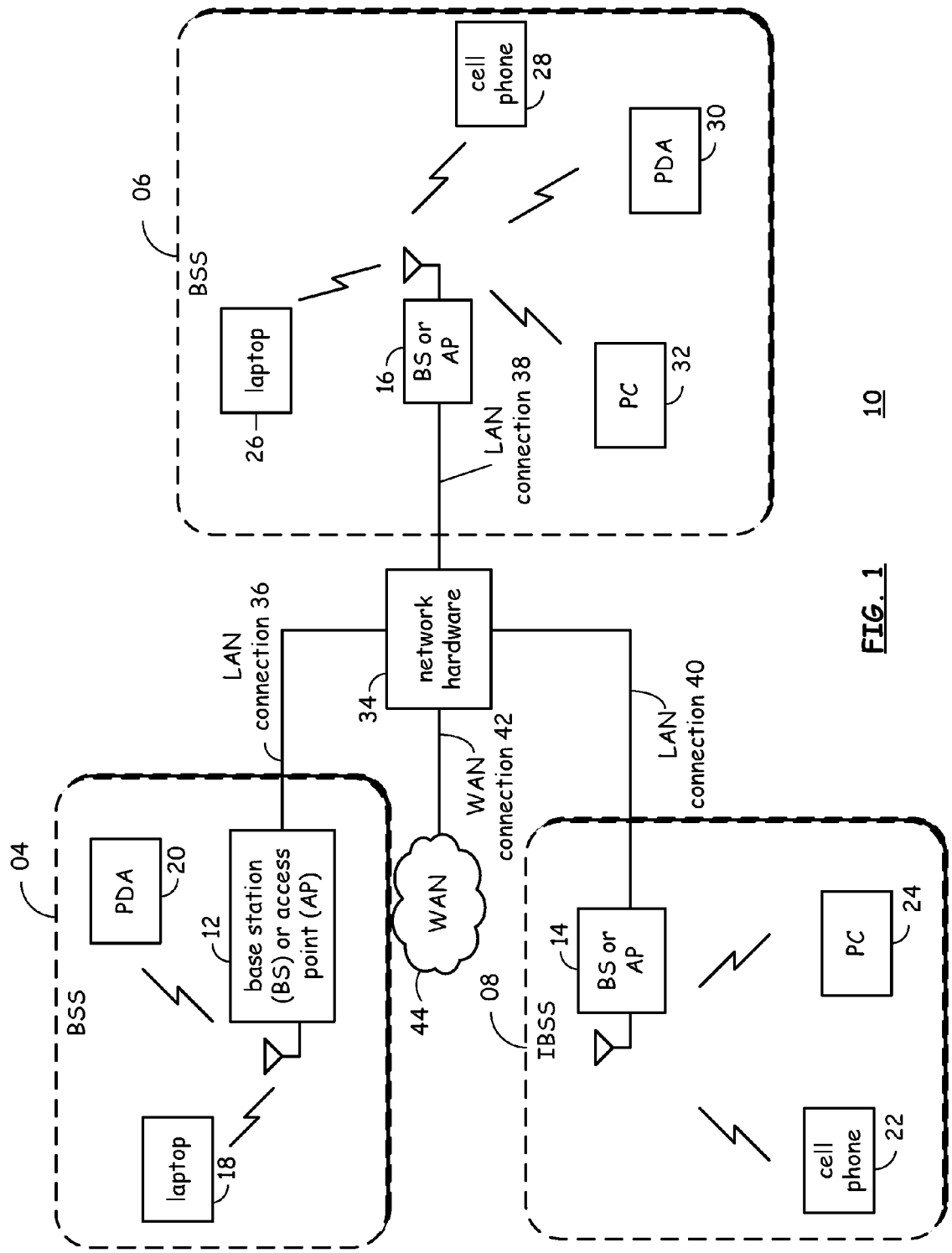
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to figures described below.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
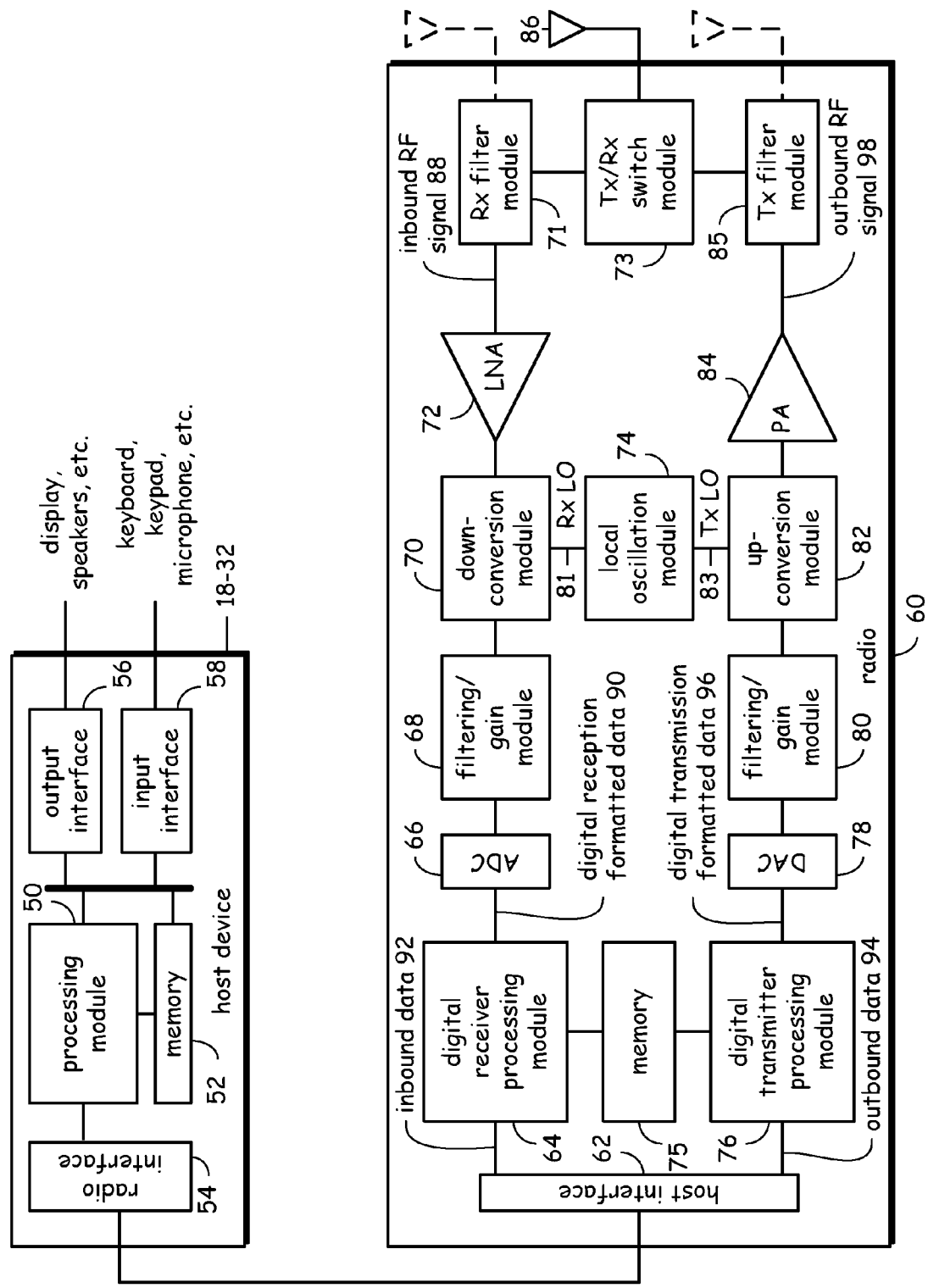
FIG. 2 is a schematic block diagram illustrating a wireless communication host device and an associated radio.

FIG. 2 is a functional block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point, and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current minor devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82, and down-conversion module 70 are implemented to perform direct conversion between baseband and RF, it is understood that the principles herein may also be applied readily to systems that implement an intermediate frequency conversion step at a low intermediate frequency.

Figure 3:
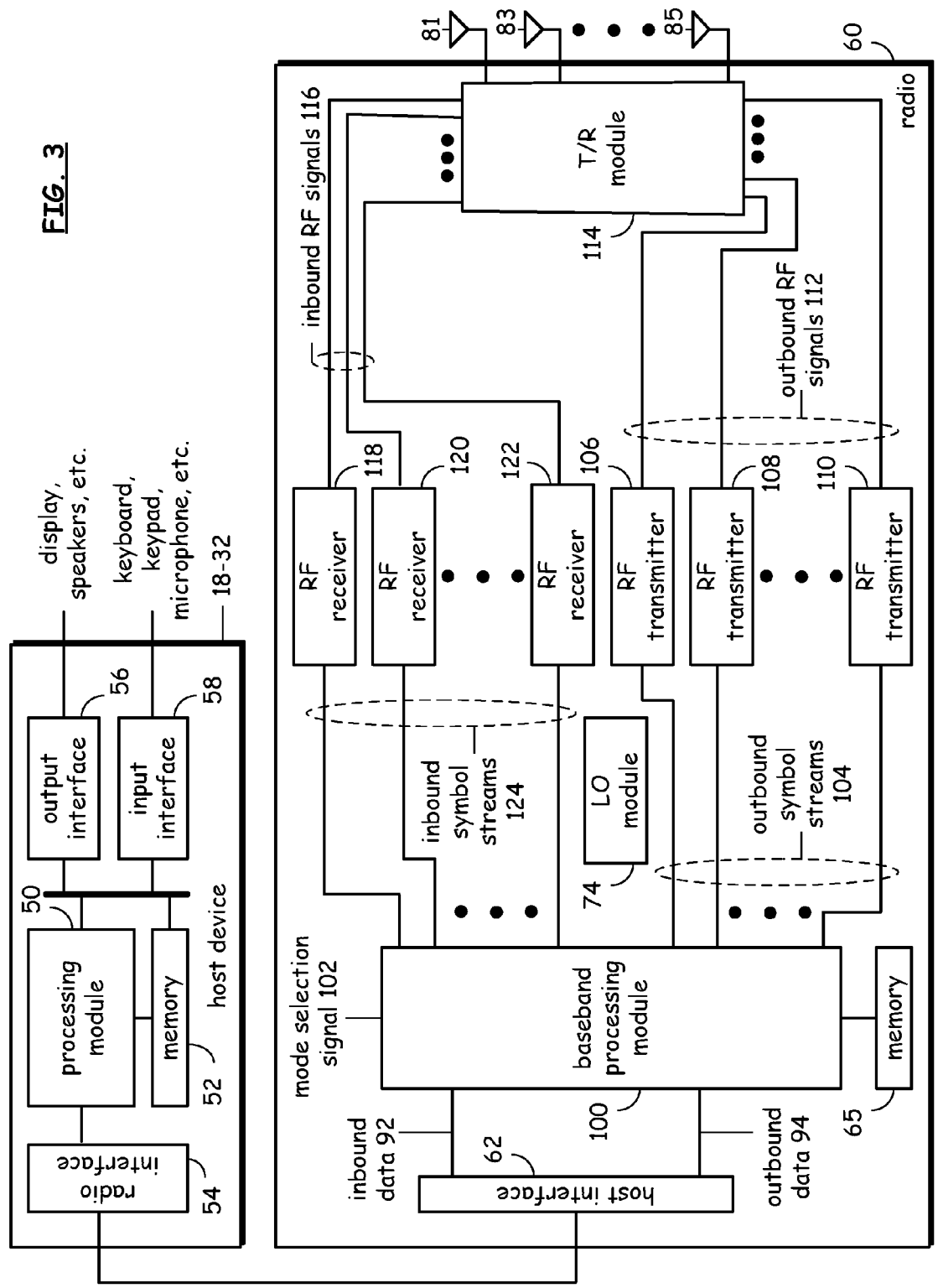
FIG. 3 is a schematic block diagram illustrating a wireless communication device that includes the host device and an associated radio.

FIG. 3 is a functional block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a multiple input multiple output (MIMO) wireless communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3, or 4 antennas, the baseband processing module 100 will produce 2, 3, or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
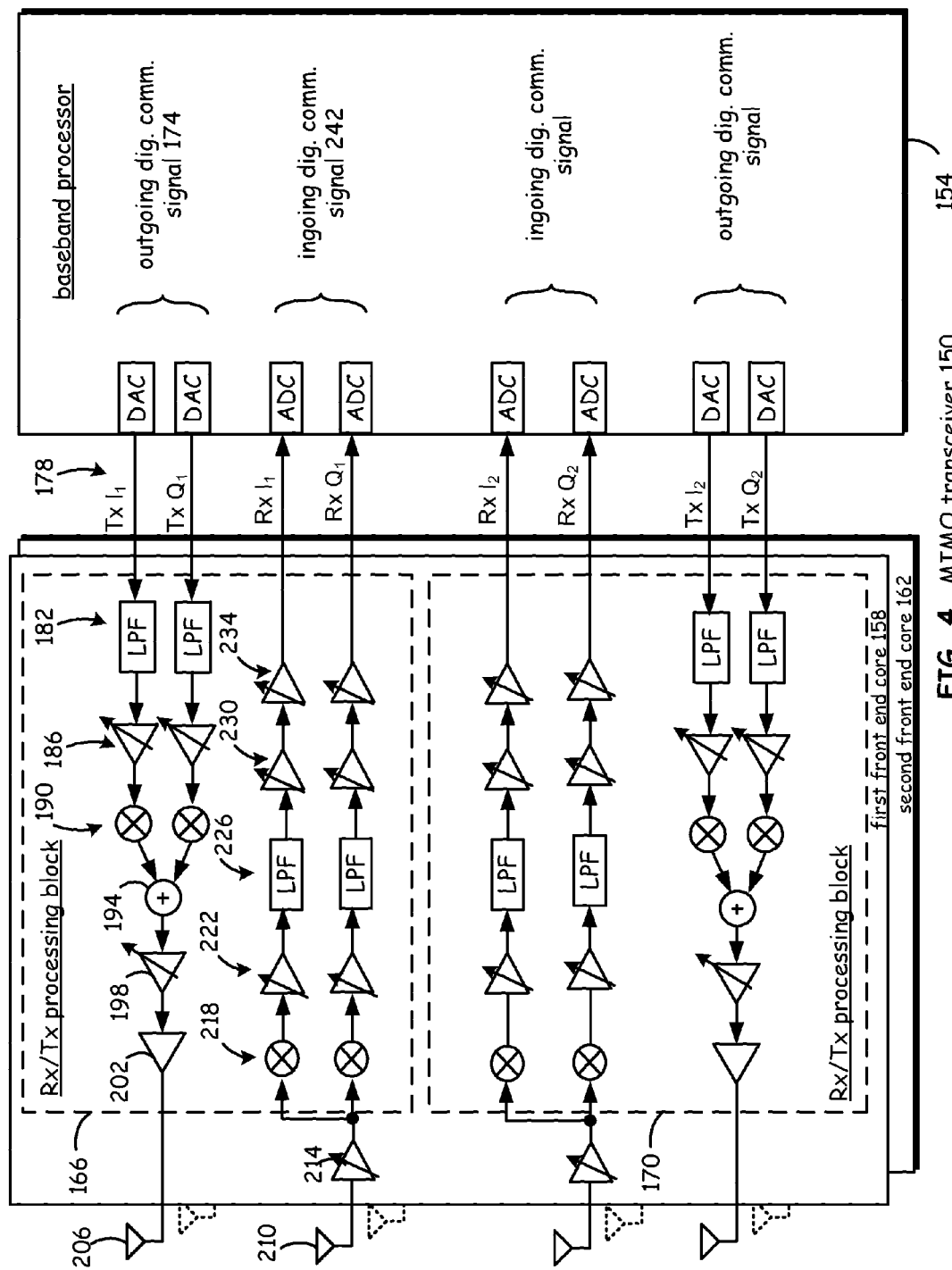
FIG. 4 is a functional schematic diagram of a MIMO transceiver formed according to one embodiment of the invention.

FIG. 4 is a functional schematic diagram of a MIMO transceiver formed according to one embodiment of the invention. A MIMO transceiver 150 includes a baseband processor 154 and a plurality of front end cores shown here as first front end core 158 and second front end core 162. It should be understood that additional front end cores may be included. First front end core 158 includes first and second Rx/Tx processing blocks 166 and 170, respectively. First Rx/Tx processing block 166 and 170 each include differential in-phase and quadrature phase (I and Q) paths for receiving first and second ingoing streams ($RxI_1$, $RxQ_1$, $RxI_2$, $RxQ_2$) and for transmitting first and second outgoing streams ($TxI_1$, $TxQ_1$, $TxI_2$, $TxQ_2$), respectively. Similarly, second front end core 162 includes third and fourth Rx/Tx processing blocks each having differential I and Q paths for receiving third and fourth ingoing streams ($RxI_3$, $RxQ_3$, $RxI_4$, $RxQ_4$) and for transmitting first and second outgoing streams ($TxI_3$, $TxQ_3$, $TxI_4$, $TxQ_4$), respectively, though these elements are not shown but are similar to what is shown in the first front end core 158. Further, as will be shown in greater detail in relation to a subsequent figure, each of the Rx and Tx signal paths between the baseband processor 154 and the first and second front end cores 158 and 162 is differential. They are shown as single ended here for simplicity.

Baseband processor 154 produces I and Q phase outgoing digital communication digital signals to the first and second front end cores 158 and 162 for processing and transmission as RF signals. For exemplary purposes, the radio front end processing of Rx/Tx processing block 166 will be discussed.

Baseband processor 154 produces outgoing analog communication signal 174 ($TxI_1$ and $TxQ_1$) over two dedicated signal paths (signal traces) shown generally at 178 to processing block 166. $TxI_1$ and $TxQ_1$ are produced by digital-to-analog converters (DACs) formed within baseband processor 154. The DACs of baseband processor 154 are operable to convert the outgoing digital communication signal 174 into an outgoing analog communication signal (I and Q path). The outgoing I and Q path analog communication signal is then produced to I and Q path low pass filters (LPFs) 182 of Rx/Tx processing block 166 over associated signal paths of the signal paths shown generally at 178.

LPFs 182 produce a low pass filtered outgoing signal (I and Q path) to high pass variable gain amplifiers (HPVGAs) 186. HPVGAs 186 produce a high-pass filtered and amplified outgoing analog signal, which is still at one of a baseband or intermediate frequency, to mixers 190. In one embodiment, the DACs and ADCs of baseband processor 154 are high sample rate devices operable to produce/receive intermediate frequency signals, respectively thereby simplifying PLL processing of the Rx/Tx processing blocks.

Mixers 190 are operable to upconvert the outgoing analog signal to an outgoing radio frequency signal based upon a local oscillation (not shown in FIG. 4). Mixers 190 produce a single ended I and Q path outgoing analog signal that is combined at a combiner 194 which is operable to produce a single outgoing RF analog signal having combined I and Q path signals. The outgoing RF analog signal is then produced to HPVGA 198 that further amplifies and high-pass filters the outgoing RF analog signal. The filtered and amplified outgoing analog signal is then produced to a power amplifier 202 (on-chip in one embodiment) for final amplification prior to transmission from an antenna 206 coupled to receive an amplified output from power amplifier 202.

On a receive path, an ingoing RF signal is received by an antenna 210 and is produced to a low noise amplifier 214 for initial amplification. An amplified differential signal (though shown as single ended in FIG. 4) is produced to a pair of mixers shown at 218 that are operable to produce a down-converted baseband or intermediate frequency ingoing continuous waveform (analog) signal. The pair of mixers 218 down-convert the ingoing RF with a received LO signal (not shown here in FIG. 4). The mixers described in the embodiments herein are Gilbert cell mixers and operate to multiply the ingoing RF with the LO to produce an output having a desired output frequency. Accordingly, the LO frequency determines, for a receiver, whether the RF is down-converted to an intermediate or to a baseband frequency signal. Similarly, for a transmitter, an LO frequency is chose according to whether an intermediate or a baseband frequency is being up-converted. Moreover, the phase of the LO signal received for the quadrature path is phase shifted by ninety degrees to create an ingoing quadrature phase signal for conduction through the quadrature signal path. Further, the mixer outputs of mixers 218 are differential signal and are conducted through the corresponding signal path as differential signals (though single ended signals are shown for simplicity). One of average skill in the art can readily appreciate such a distinction and operation and connectivity of the same.

The mixer 218 outputs are then produced to HPVGAs 222, LPFs 226 and HPVGAs 230 and 234 as shown in FIG. 4 where they are amplified, high-pass filtered, low-pass filtered and subsequently high-pass filtered and amplified. The high-pass filtered ingoing analog signals are then produced to analog-to-digital converters within baseband processor 154 that are operable to produce an ingoing digital stream 242 that comprises the in-phase and quadrature-phase signal paths ($RxI_1$, $RxQ_1$) that are then processed by baseband processor 154.

While not explicitly described, the operation of Rx/Tx processing block 170 should be understood to be similar to that of Rx/Tx processing block 166. Further, in one embodiment, a second front end core 162 is shown "behind" the first front end core 158, which second front end core 162 includes similar third and fourth Rx/Tx processing blocks whose topology and operation is similar to that of processing block 166.

Digital data rate requirements between a radio front end that includes one or more front end cores may become difficult to achieve for high data rate applications that include a plurality of front end processing blocks. The embodiment of FIG. 4 allows, however, for substantially higher data rates by dedicating interface lines between the baseband processor and the front end core(s) for differential in-phase and quadrature-phase signals in an analog form. Thus, just for one processing block as shown in FIG. 4, eight lines are required between the front end core and the baseband processor.

In the specific example of FIG. 4 having a total of four processing blocks on two different cores, a total of thirty two lines are required for carrying ingoing and outgoing communication signals between the front end cores and the baseband processor assuming differential signaling is used as described herein. Finally, it should be noted that in addition to the first transmit and receive antennas 206 and 210, respectively are coupled to the corresponding transmit and receive signal paths. While not numbered, it may be seen that Rx/Tx processing block 170 of the first front end core 158 also includes similarly configured antennas which form second transmit and receive antennas. Similarly, third and fourth transmit and receive antennas, respectively, are shown in dashed lines for the third and fourth Rx/Tx processing blocks of second front end core 162. If a device were to have additional front end cores, a similar configuration would be found therefor as well.

Figure 5:
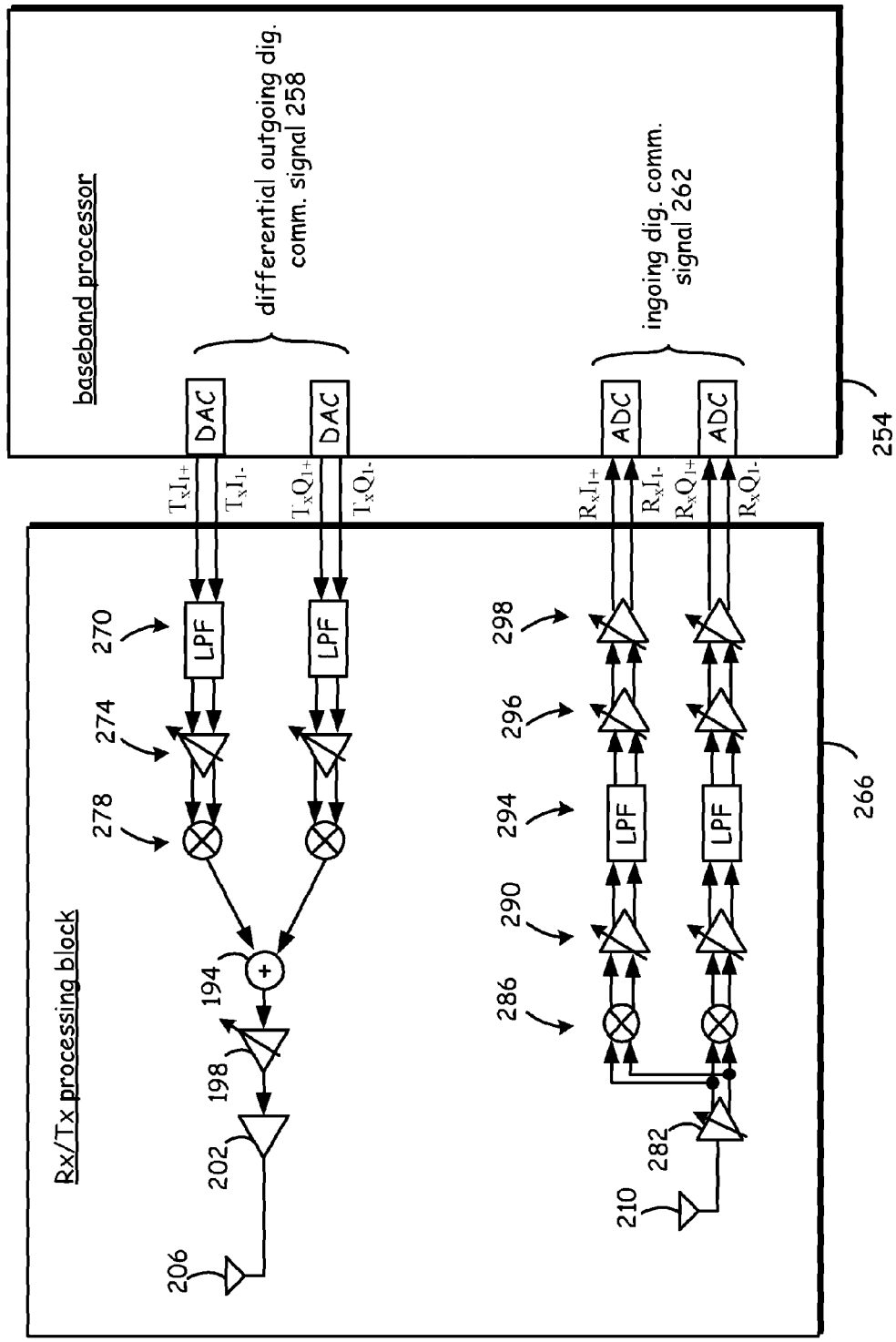
FIG. 5 is functional schematic diagram of an Rx/Tx processing block of a front end core of a MIMO transceiver formed according to one embodiment of the invention.

FIG. 5 is functional schematic diagram of an Rx/Tx processing block of a front end core of a MIMO transceiver formed according to one embodiment of the invention. A MIMO transceiver 250 includes a baseband processor 254 operable to generate differential outgoing digital communication signals 258 and to convert the signals 258 to an analog form. Baseband processor 254 is operably disposed to transmit outgoing communication signals in an analog form and to receive ingoing analog differential communication signals. Baseband processor is further operable to convert the received differential analog differential communication signals to ingoing digital communication signal 262. The outgoing and ingoing differential analog communication signals are transmitted to and received from an Rx/Tx processing block 266, respectively.

Operation of the individual elements is similar to that described in relation to FIG. 4 except that in FIG. 5 actual differential connectivity is shown. Thus, baseband processor 254 produces the differential outgoing digital communication signal 258 (prior to conversion to an analog form) that includes in-phase and quadrature-phase components, namely, $TxI_{1+}$, $TxI_{1-}$, $TxQ_{1+}$, and $TxQ_{1-}$. Thus, baseband processor 254 produces differential analog I and Q path Tx signals to Rx/Tx processing block 266. Block 266 and more particularly, LPFs 270 receive the differential analog I and Q path Tx signals from baseband processor 254 and produce a differential filtered output to HPVGAs 274. An amplified and high-pass filtered differential I and Q path signals are then produced to mixers 278 that produces single ended I and Q path signals that are combined in a combiner 194.

Similarly, baseband processor 254 receives the differential ingoing digital communication signal 262 that includes in-phase and quadrature-phase components, namely, from ADCs within the baseband processor.

As with the prior described embodiment, an antenna receives an ingoing RF communication signal and passes the signal to a low noise amplifier. LNA 282 receives the ingoing RF and produces an amplified differential RF signal to both differential mixers 286. Mixers 286 produce a differential down-converted signal to HPVGA 290 which, in turn, produces a differential amplified and high-pass filtered signal to a differential LPF 294 for each of the I and Q paths. Each LPF 294 then produces a low-pass filtered differential output to HPVGA 296 which produces a differential high-pass filtered and amplified output to HPVGA 298. HPVGA 298 produces a differential high-pass filtered and amplified output as an input signal comprising $RxI_{1+}$, $RxI_{1-}$, $RxQ_{1+}$, and $RxQ_{1-}$ to the ADCs of baseband processor 254 for the I and Q signal receive paths.

The aspects illustrated in FIG. 5 apply equally to each processing block operably disposed to transmit or receive communication signals between the processing block and the baseband processor. The circuit of FIG. 5 may be used to add clarity to the embodiment of FIG. 4 that was described as being differential though only single ended layouts were shown.

Figure 6:
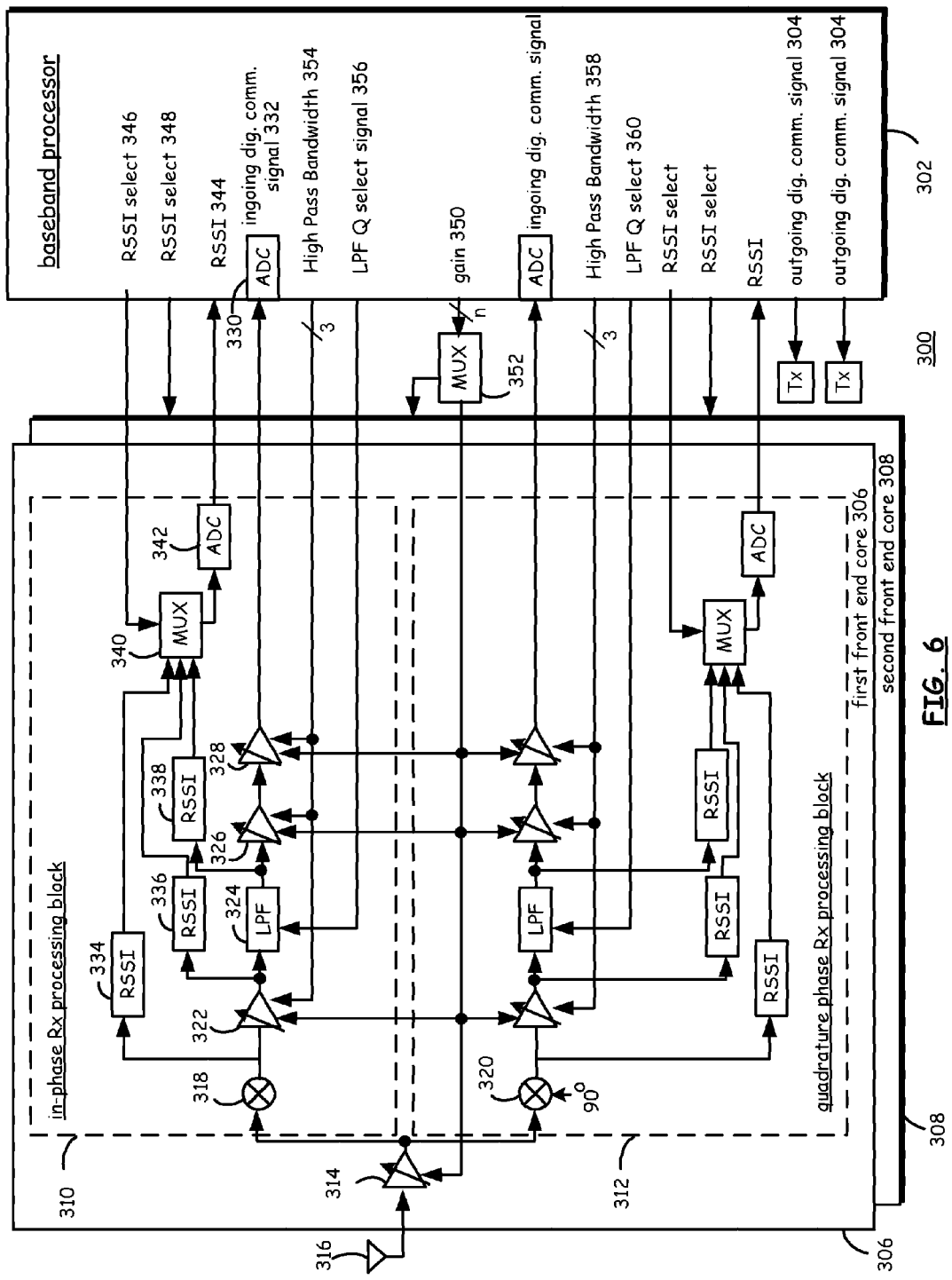
FIG. 6 is a functional schematic diagram of a radio transceiver according to one embodiment of the invention.

FIG. 6 is a functional schematic diagram of a radio transceiver according to one embodiment of the invention. A radio transceiver 300 includes a baseband processor 302 that is operable to receive ingoing digital communication signals from a receive path and to produce outgoing digital communication signals to a transmit path wherein the receive path and transmit path are both formed within a radio front end and are differential in the described embodiment but are shown as single ended for simplicity. As may be seen, outgoing signals, shown here as outgoing digital communication signal 304, are produced to transmit circuitry labeled "Tx." In the embodiment shown of FIG. 6, radio transceiver 300 includes first and second cores that each include receive path circuitry for a radio front end. The transmit circuitry may be formed within the first and second cores or may be formed separately. Here, in FIG. 6, the receive path circuitry for the in-phase and quadrature phase signal paths for only one Rx circuit is shown for exemplary purposes but should be understood to be part of the first and second cores and of each Rx or Rx/Tx block therein.

Generally, baseband processor 302 is operable to communicate with a radio front end to transmit and receive wireless communication signals. In the described embodiment of the invention, baseband processor 302 is operable to communicate with a plurality of front end cores that each include receive path and transmit path circuitry. In the example shown of FIG. 6, baseband processor 302 is operable to communicate with a first front end core 306 and with a second front end core 308. It should be understood that cores 306 and 308 are substantially similar in topology and facilitate a wireless transceiver communicating over a plurality of different frequency bands.

Generally, FIG. 6 illustrates a radio transceiver having first and second front end cores 306 and 308 that each include an in-phase Rx processing block 310 and a quadrature phase Rx processing block 312. Both the in-phase Rx processing block 310 and quadrature phase Rx processing block 312 are operably coupled to a low noise amplifier 314 that, in turn, is coupled to an antenna 316. Low noise amplifier 314 receives an RF signal detected from antenna 316 and produces an amplified RF signal to a pair of mixers that down-convert the received RF to one of an intermediate frequency or baseband frequency signal. In the described embodiment of the invention, mixers 318 and 320 down-convert the amplified RF produced by low noise amplifier 314 to an intermediate frequency signal. In an alternate embodiment, the signal is down-converted to a baseband frequency.

Because a local oscillation used by mixer 320 is offset by 90 degrees relative to mixer 318, processing blocks 310 and 312 are operable to process the in-phase and quadrature phase components of the down-converted signals produced by the corresponding mixers 318 and 320. With the exception of the operation of the mixers as described, the remaining operation of the in-phase Rx processing block 310 and the quadrature phase Rx processing block 312 are substantially similar. As such, only the operation of in-phase Rx processing block 310 will be thoroughly described in the remainder of the discussion of FIG. 6.

Generally, it may be seen that an output of mixer 318 is produced to a high pass variable gain amplifier 322 that high pass filters and amplifies the baseband frequency signals received from mixer 318 to produce a wideband signal to a low pass filter 324. Low pass filter 324 then filters the wideband signal to produce a narrow band signal to a high pass filter variable gain amplifier 326. The output of high pass variable gain amplifier 326 is then produced to a second high pass variable gain amplifier 328. An amplified and high pass filtered narrowband signal is then produced from high pass variable gain amplifier 328 to an analog-to-digital converter 330 of baseband processor 302. Analog-to-digital converter 330 produces an ingoing digital communication signal 332 for processing by baseband processor 302. Typically, an ADC such as ADC 330 can only accept a signal with a specified signal magnitude in order to properly convert the signal from analog to digital form. If the signal magnitude is too low, the ADC cannot properly detect it. If the signal magnitude is too high, clipping occurs and inaccurate signal values resulting from quantization errors are produced as digital signals. Accordingly, the gain levels within the receive signal paths are adjusted according to signal strength and interference levels to enable the baseband processor ADCs to operate properly.

Disposed between the various elements described here in the receive path of in-phase Rx processing block 310 (namely, mixer 318, HP-VGAs 322, 326 and 328, and LPF 324 are a plurality of nodes used as sample points for a plurality of received signal strength indicator blocks. For example, a first received signal strength indicator (RSSI) block 334 is operably coupled to sample a wideband signal at a baseband frequency produced by mixer 318. A second RSSI block 336 is operably coupled to sample a signal strength of a high-pass filtered and amplified wideband signal at a sample node disposed between high pass variable gain amplifier 322 and low pass filter 324. A third RSSI block 338 is operably coupled to sample a received signal strength indication from a sample node disposed between low pass filter 324 and high pass variable gain amplifier 326.

The signal sampled at this node is a narrowband signal because it is received from a sample node disposed downstream of the low pass filter 324. Each of the outputs of RSSI blocks 334, 336 and 338, are produced to a multiplexer (or, more accurately, a de-multiplexer) 340, which, in turn, produces a selected RSSI block output to an analog-to-digital converter 642. Analog-to-digital converter block 342 produces a digital RSSI 344. As may further be seen, mux 340 is operably coupled to receive an RSSI select signal 346 that is used to select between the outputs of RSSI blocks 334, 336 and 338. As may further be seen, baseband processor 302 also generates an RSSI select signal 348 is produced to second front end core 308. More specifically, RSSI select signal 348 is produced to a multiplexer similar to mux 340 of first front end core 306.

Continuing to refer to FIG. 6, it may be seen that baseband processor 302 produces an n-bit wide gain signal 350 for delivery to a plurality of amplification units disposed within in-phase Rx processing block 310 and quadrature phase Rx processing block 312. Specifically, however, the n-bit wide gain signal 350, hereinafter gain 350, is produced to a multiplexer 352 that selectively routes the gain signal either to first front end core 306 or second front end core 308. In one embodiment of the present invention, gain 350 is a 13-bit wide gain signal that is produced to low noise amplifier 314 of first front end core 306, as well as to high pass variable gain amplifiers 322, 326 and 328, in one embodiment of the invention by way of mux 352. Because gain 350 is muxed to the first and second front end cores 306 and 308, only one set of 13-bit wide output pins must be used from baseband processor 302.

While gain 350 is multiplexed between the first front end core 306 and the second front end core 308, a high pass bandwidth control command 354 and a low pass filter Q select signal 356 are produced directly to the high pass variable gain amplifiers and to the low pass filter, respectively. In the described embodiment, separate dedicated lines are produced not only to the first and second front end cores 306 and 308, but also to the corresponding amplifiers within the in-phase Rx processing block 310 and the quadrature phase Rx processing block 312. In an alternate embodiment, dedicated lines are produced to each front end core but are shared between the corresponding elements in the in-phase Rx processing block 310 and quadrature phase Rx processing block 312.

Generally, FIG. 6 illustrates that some signals may be multiplexed (or switched using other known switching devices) between the first front end core 306 and the second front end core 308, while others may be coupled directly to the circuit elements that are to receive the associated control command. As a general rule, the devices whose responses are the most time critical are selected to be given dedicated lines, while the devices whose response is not as time critical are routed through a multiplexer to reduce the required dedicated pins from the baseband processor. In the case of the gain signal 350, for example, it may be seen that 13 pins are saved if a 13-bit wide signal path is multiplexed to produce gain signal 350 to the first and second front end cores 306 and 308, respectively.

As may be seen, high pass bandwidth control command 354 and low pass filter Q select signal 356 are produced to high pass variable gain amplifiers 322, 326, 328 and low pass filter 324, respectively, of in-phase Rx processing block 310. Similarly, high pass bandwidth control command 358 is produced to high pass variable gain amplifiers of the quadrature phase Rx processing block, while a low pass filter Q select signal 360 is produced to a low pass filter of the quadrature phase Rx processing block 312. While not all the connections between the baseband processor 302 and the quadrature phase Rx processing block 312 need to be described because they are similar to what was described for the in-phase Rx processing block 310, these two signals are discussed to show that the quadrature phase Rx processing block also receives a dedicated signal that is coupled directly between it and the baseband processor.

In an embodiment of a transceiver 300 that includes two cores, four low pass filter Q select signals are utilized to select the quiescent point of corresponding low pass filters of the in-phase and quadrature phase Rx processing blocks of the first and second front end cores 306 and 308. In an alternate embodiment, a dedicated signal is produced to both the in-phase Rx processing block 310 and to the quadrature phase Rx processing block 312 in contrast to what is shown here wherein two dedicated signal lines are produced for each of these types of signal just for the first front end core 306. The alternate embodiment requires two dedicated lines for transmitting the low pass filter Q select signals wherein one would go to the first front end core 306 and the second one would go to the second front end core 308.

Referring again to the high pass bandwidth control command 354 and 358, it may be seen that the outgoing signal is actually produced over three separate dedicated lines to each of the high pass variable gain amplifiers associated therewith as shown here in FIG. 6. Accordingly, baseband processor 302 is operable to individually select a high pass bandwidth for each of the high pass variable gain amplifiers on either the in-phase Rx processing block 310 or the quadrature phase Rx processing block 312.

One interesting aspect of the embodiment of FIG. 6 is that front end core 308 includes analog-to-digital converter block 342 for converting an output of mux 340 to a digital signal prior to being produced to baseband processor 302 while the output of HPVGA 328 is produced to baseband processor 302 as an analog signal wherein ADC 330 within baseband processor 320 converts the output of HPVGA 328 to ingoing digital communication signal 332. In an alternate embodiment, all signals between the front end cores and the baseband processor carry analog signals and are converted between analog form and digital form within baseband processor 302.

Finally, as with FIG. 4 above, the circuitry is shown as single ended though in at least one embodiment, differential circuitry may be used as in the embodiments of FIGS. 4 and 5. Thus, in an embodiment of the invention that includes circuitry for setting gain levels and determining proper gain levels through the use of a plurality of RSSI blocks and a Mux to pick between the various connection points based upon a control signal from the baseband processor 302, differential signal paths may be formed between the Rx/Tx processing blocks and the baseband processor.

Figure 7:
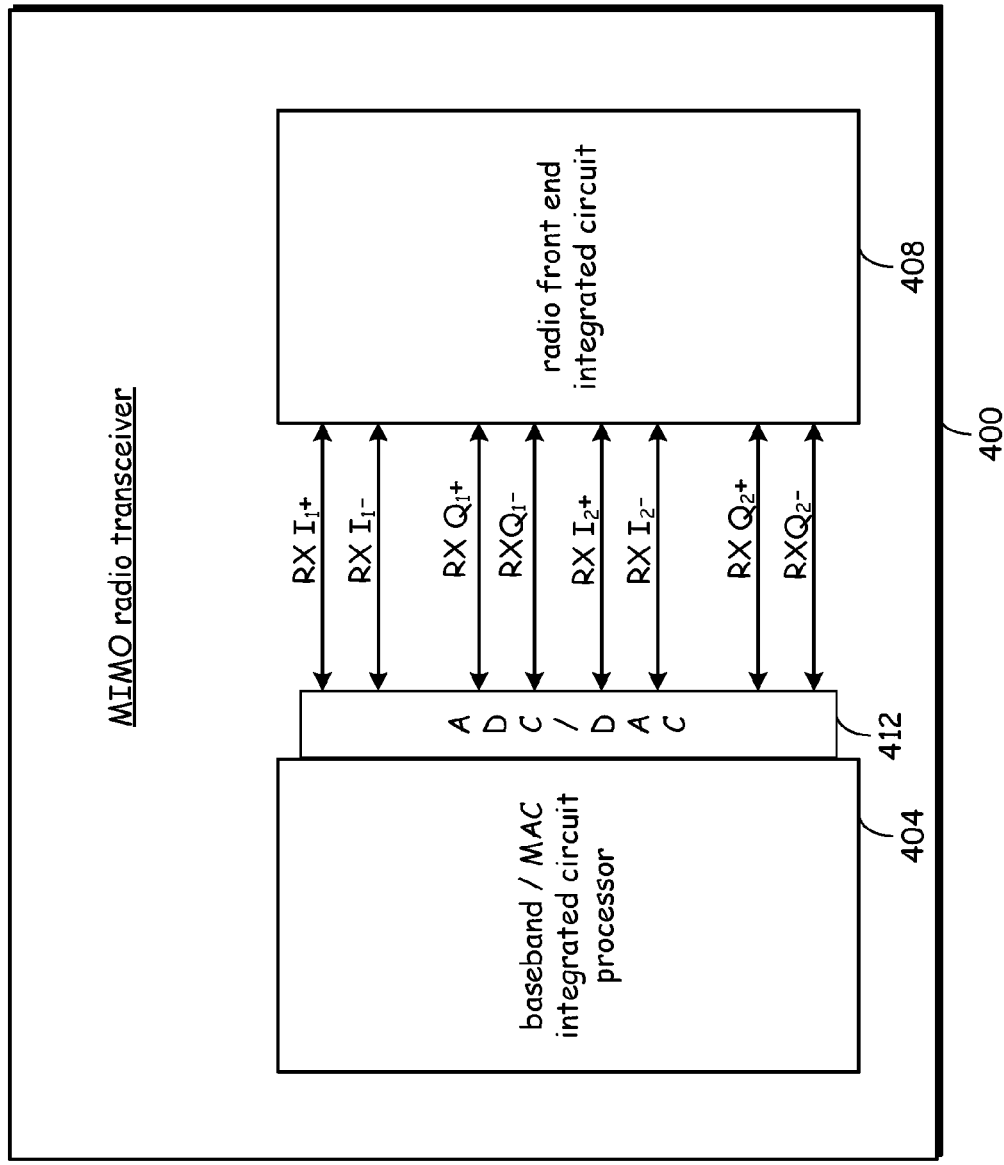
FIG. 7 is a functional block diagram of a MIMO radio transceiver according to one embodiment of the invention.

FIG. 7 is a functional block diagram of a MIMO radio transceiver according to one embodiment of the invention. As may be seen, a MIMO radio transceiver 400 comprises a baseband/MAC integrated circuit processor 404 operable to produce and receive high data rate outgoing and ingoing data in a digital form. A radio front end integrated circuit is operable to wirelessly transmit the high data rate outgoing data in an analog form. An analog interface is provided there between the processor 404 and the radio front end integrated circuit 408 comprising at least eight lines for differential I and Q channel communications for a pair of antennas. Finally, within the baseband/MAC integrated circuit processor, digital-to-analog/analog-to-digital (ADC/DAC) conversion circuitry 412 with a high sample rate operable to convert ingoing data between digital form and analog form.

Thus, the MIMO radio transceiver comprises eight lines for carrying $RXI_{1+}$, $RXI_{1-}$, $RXQ_{1+}$, and $RXQ_{1-}$ for communications over a first antenna and for carrying $RXI_{2+}$, $RXI_{2-}$, $RXQ_{2+}$, and $RXQ_{2-}$ for communications over a second antenna. In one embodiment, the MIMO radio transceiver utilizes the same eight lines for carrying TXI1+, TXI1−, TXQ1+, and TXQ1− for communications over a first antenna and for carrying TXI2+, TXI2−, TXQ2+, and TXQ2− for communications over a second antenna.

Figure 8:
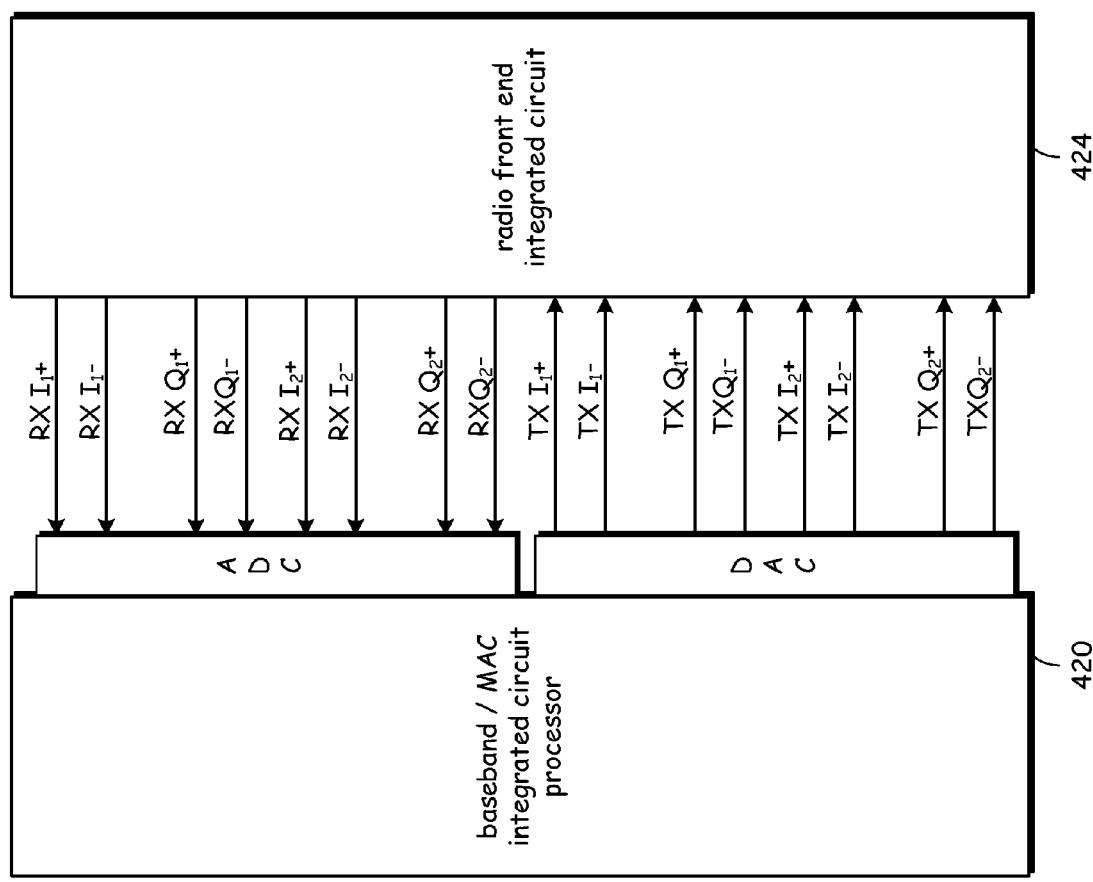
FIG. 8 is an alternate embodiment of the invention that shows the use of a set of dedicated lines for transmitting each differential outgoing signal and a set of dedicated liens for receiving each differential ingoing signal.

FIG. 8 is an alternate embodiment of the invention that shows the use of a set of dedicated lines for transmitting each differential outgoing signal and a set of dedicated liens for receiving each differential ingoing signal. Comparing FIGS. 7 and 8, it may be seen that FIG. 8 includes twice as many lines since there is no sharing between outgoing and ingoing signals.

In the described embodiments of the MIMO radio, the in-phase and quadrature paths within the radio front end integrated circuit are matched to reduce I/Q imbalance. Matching to reduce I/Q imbalance may be accomplished in different ways.

In one embodiment of the invention, I and Q buffer configurations and circuit paths within baseband/MAC integrated circuit processor are matched to reduce I/Q imbalance. In one embodiment, in-phase (I) and quadrature (Q) trace lengths connecting the analog baseband portion of the transceiver to the RF portion of the transceiver are matched in length. I and Q buffer configuration and circuit paths within the baseband/MAC integrated circuit processor are matched to reduce I/Q imbalance. Similarly, I and Q paths within the interface between the radio front end integrated circuit and the baseband processor are matched to reduce I/Q imbalance. Along the same lines, I and Q paths within the interface between the radio front end integrated circuit and the baseband/MAC integrated circuit processor are matched to reduce I/Q imbalance. Finally, I and Q output paths are impedance matched within the baseband/MAC integrated circuit processor to reduce I/Q imbalance. In an alternate embodiment, in place of trace matching as described above, lumped-element filters, implemented with capacitors, inductors, and/or resistors are used to match the source and load impedances of the I and Q signal traces.

Figure 9:
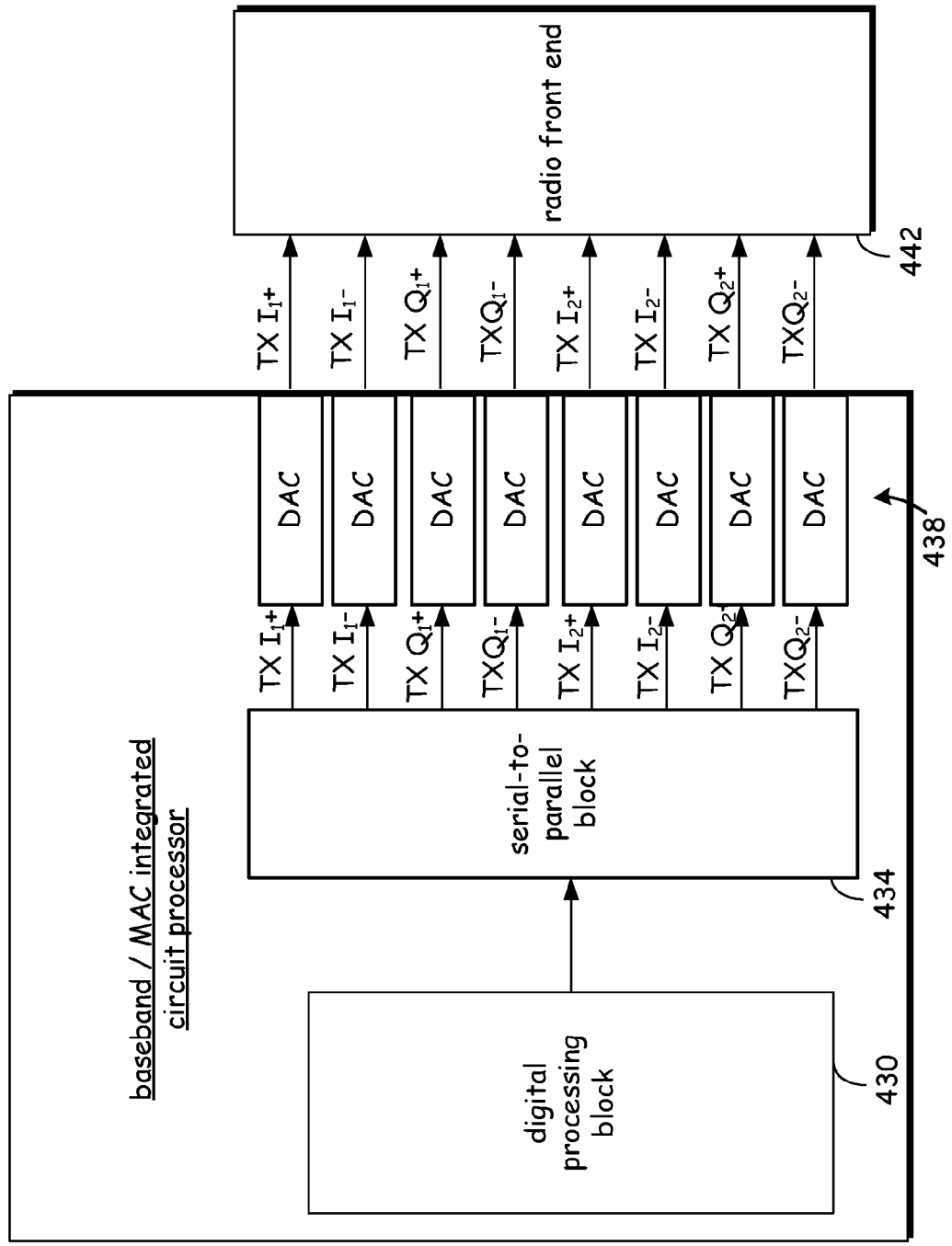
FIG. 9 is a functional block diagram of one embodiment of the invention that illustrates an alternate baseband/MAC integrated circuit processor/radio front end combination.

FIG. 9 is a functional block diagram of one embodiment of the invention that illustrates an alternate baseband/MAC integrated circuit processor/radio front end combination. Specifically, for a transmitter, a digital processing block 430 is operable to generate an outgoing digital stream to a serial-to-parallel block 434. Serial-to-parallel block 434 is operable to convert the serial digital stream to a plurality of parallel outgoing digital streams. In the described embodiment, for a transmitter, eight outgoing differential parallel streams for carrying I and Q signal components for two outgoing signals is shown (for two processor blocks such as shown in FIG. 4). Each of the outgoing differential parallel streams is then produced to a corresponding digital-to-analog converter block (within the baseband/MAC integrated circuit processor) shown generally at 438. The DACs 438 then produce corresponding continuous (analog) waveform outgoing differential I and Q signal components to radio front end 442 for front end processing as described elsewhere herein.

While FIG. 9 only illustrates a configuration for a transmitter, it should be understood that the baseband processor may also include a corresponding number of analog-to-digital blocks for converting ingoing signals to digital format for eight Rx signal components for two ingoing communication signals in a MIMO transceiver. A receiver would further include a parallel-to-serial block for converting the ingoing parallel signal components to one or more serial streams. It should further be understood that for the transmitter as well as the receiver configurations, one or more digital signal paths may exists between the processing block and one of the parallel-to-serial or serial-to-parallel blocks.

Figure 10:
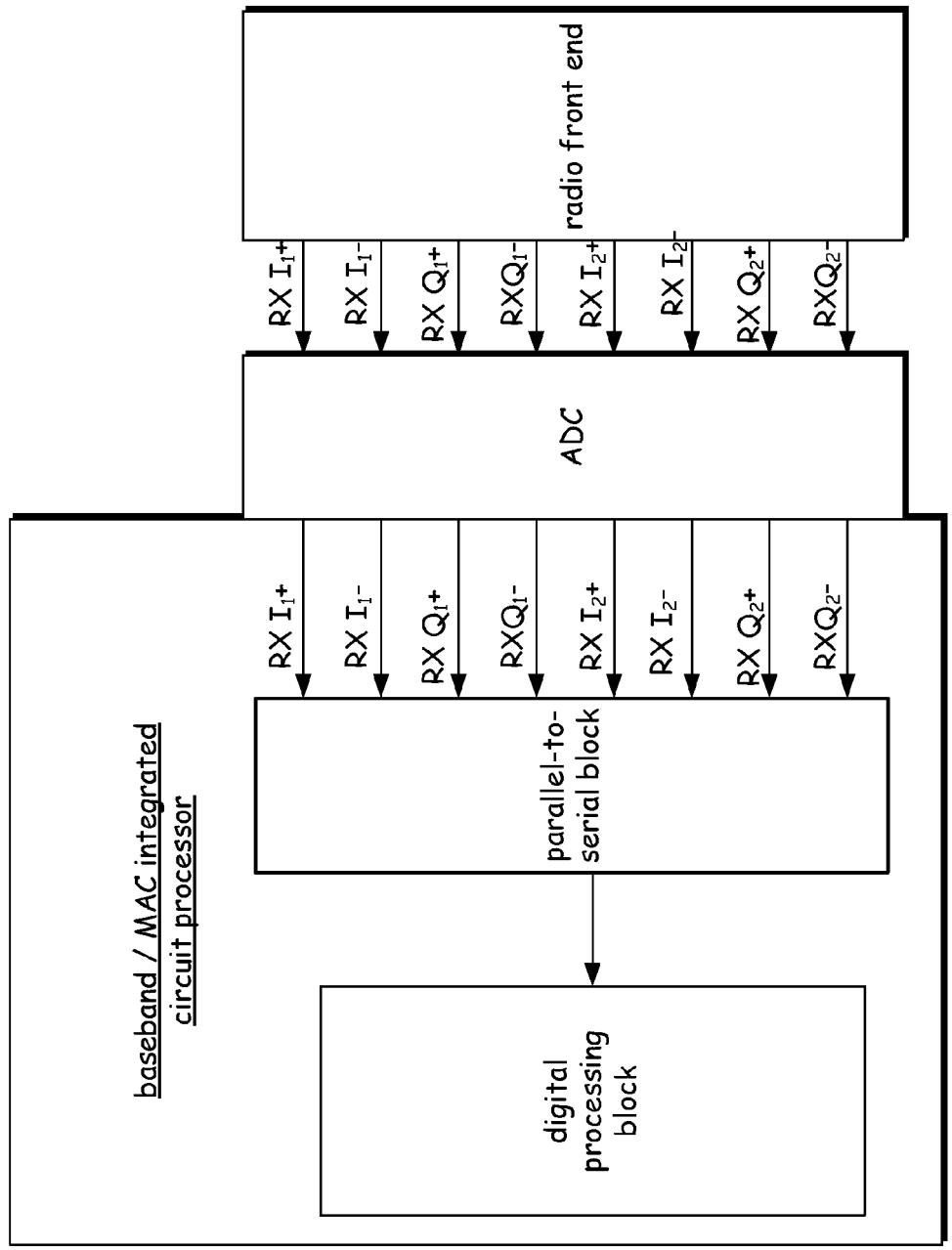
FIG. 10 is a functional block diagram of an alternate embodiment of a receiver.

FIG. 10 is a functional block diagram of an alternate embodiment of a receiver and illustrates as described above. The ADC, as with the other embodiments, may comprise a single block or a plurality of blocks for a plurality of circuit paths. One significant aspect of some of the embodiments of the present invention is that the interface between the integrated circuit radio front end is analog thereby increasing outgoing and ingoing signal capacity. Coupling the analog interfaces with dedicated differential signal paths for receiving and transmitting signals maximizes signal throughput.

Figures 11, 12:
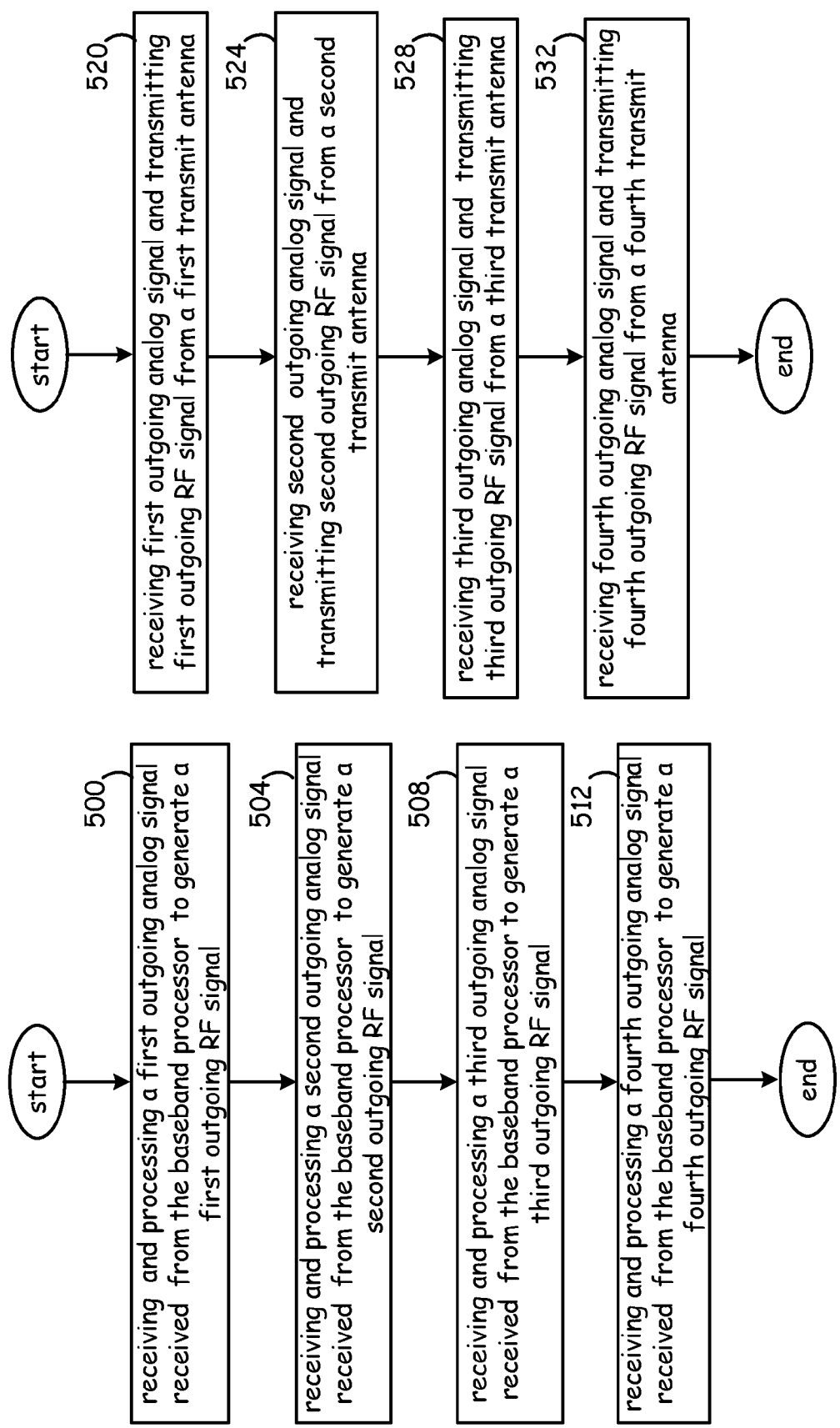
FIG. 11 is a flow chart illustrating one embodiment of a method of the present invention.
FIG. 12 is a flow chart illustrating one embodiment of a method of the present invention for transmitting outgoing analog signals received in an analog form from a baseband processor.

FIG. 11 is a flow chart illustrating one embodiment of a method of the present invention. The method includes initially receiving and processing a first ingoing analog signal received at a first receive antenna to produce a first amplified and filtered analog signal to a baseband processor (step 500). In at least one embodiment, the first ingoing analog signal is a differential signal. Thereafter, the method includes receiving and processing a second ingoing analog signal received at a second receive antenna to produce a second amplified and filtered analog signal (differential in one embodiment) to the baseband processor (step 504).

For a system that includes a third Rx/Tx processing core, the method further includes receiving and processing a third ingoing analog signal received at a third receive antenna to produce a third amplified and filtered analog signal (differential in one embodiment) to a baseband processor (step 508). Finally, for a system that includes a fourth Rx/Tx processing block, the method includes receiving and processing a fourth ingoing analog signal received at a fourth receive antenna to produce a fourth amplified and filtered analog signal (differential in one embodiment) to the baseband processor (step 512). The method also includes processing outgoing signals.

FIG. 12 is a flow chart illustrating one embodiment of a method of the present invention for transmitting outgoing analog signals received in an analog form from a baseband processor. Thus, the method includes receiving first outgoing signals in an analog form from the baseband processor and transmitting first outgoing RF signal from a first transmit antenna (step 520). The method also includes receiving and processing a second outgoing analog signal received from the baseband processor in an analog form (differential in one embodiment) to generate a second outgoing RF signal and transmitting the second outgoing RF signal from a second transmit antenna (step 524). After this, the method includes receiving and processing a third outgoing analog signal in an analog form (differential in one embodiment) received from the baseband processor to generate a third outgoing RF signal and transmitting the third outgoing RF signal from a third transmit antenna (step 528). Thereafter, the method includes transmitting and processing a fourth outgoing analog signal (differential in one embodiment). Finally, the method includes receiving and processing a fourth outgoing analog signal received from the baseband processor in an analog form (differential in one embodiment) to generate a fourth outgoing RF signal and transmitting the fourth outgoing RF signal from a fourth transmit antenna (step 532).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled."

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents, and alternatives falling within the spirit and scope of the present invention as defined by the claims. As may be seen, the described embodiments may be modified in many different ways without departing from the scope or teachings of the invention.

The invention claimed is:

1. A multiple-input-multiple-output (MIMO) radio transceiver, comprising:
   a plurality of front end cores, each servicing respective receive in-phase and quadrature phase differential signals and transmit in-phase and quadrature phase differential signals of a plurality of MIMO signals and including a plurality of Received Signal Strength Indicator (RSSI) circuits; and
   a MIMO signal interface coupling the plurality of front end cores to at least one baseband processor and configured to receive an RSSI select signal to select at least one output of the plurality of RSSI circuits.

2. The MIMO radio transceiver of claim 1, further comprising a plurality of Analog to Digital Converters (ADCs), each servicing a respective differential signal path.

3. The MIMO radio transceiver of claim 1, further comprising a plurality of Digital to Analog Converters (DACs), each servicing a respective differential signal path.

4. The MIMO radio transceiver of claim 1:
   wherein at least one front end core of the plurality of front end cores comprises two Rx/Tx processing blocks; and
   further comprising sixteen differential analog signal paths coupling the at least one front end core to the at least one baseband processor.

5. The MIMO radio transceiver of claim 1, wherein:
   at least one front end core further comprises:
      at least one low pass filter having quality tunable based upon at least one filter input signal; and
      at least one high pass filter having a bandwidth selectable based upon the at least one filter input signal; and
   the MIMO signal interface further receiving the at least one filter input signal.

6. The MIMO radio transceiver of claim 1, further comprising a plurality of antennas operable to concurrently service at least two active communication links.

7. The MIMO radio transceiver of claim 1, wherein each in-phase and quadrature phase transmit path is impedance matched to reduce I/Q imbalance.

8. The MIMO radio transceiver of claim 1, wherein the MIMO signal interface is operable to service both ingoing and outgoing differential signals during overlapping signal periods.

9. A method for operating a multiple-input-multiple-output (MIMO) transceiver comprising:
   at each of a plurality of front end cores of the MIMO transceiver, servicing respective receive in-phase and quadrature phase differential signals and transmit in-phase and quadrature phase differential signals of a plurality of MIMO signals;
   by a MIMO signal interface, coupling the plurality of front end cores to at least one baseband processor and receiving a Received Signal Strength Indicator (RSSI) select signal; and
   selecting, based upon the RSSI select signal, one of a plurality of RSSI circuits of the plurality of front end cores of the MIMO transceiver for output.

10. The method of claim 9, further comprising respective differential signal path by a plurality of Analog to Digital Converters (ADCs).

11. The method of claim 9, further comprising servicing a respective differential signal path by a plurality of Digital to Analog Converters (DACs).

12. The method of claim 9, further comprising coupling the at least one front end core to the at least one baseband processor by sixteen differential analog signal paths.

13. The method of claim 9, further comprising:
   receiving at least one filter input signal;
   tuning at least one low pass filter based upon the at least one filter input signal; and
   tuning at least one bandwidth selectable high pass filter based upon the at least one filter input signal.

14. The method of claim 9, further comprising concurrently servicing at least two active communication links via a plurality of antennas.

15. The method of claim 9, further comprising impedance matching each in-phase and quadrature phase transmit path to reduce I/Q imbalance.

16. The method of claim 9, further comprising servicing both ingoing and outgoing differential signals during overlapping signal periods.

17. A multiple-input-multiple-output (MIMO) radio transceiver, comprising:
   a plurality of front end cores, each comprising at least two Rx/Tx processing blocks and servicing respective receive in-phase and quadrature phase differential signals and transmit in-phase and quadrature phase differential signals of a plurality of MIMO signals; and
   a MIMO signal interface coupling the plurality of front end cores to at least one baseband processor, the MIMO signal interface comprising, for each front end core, at least sixteen differential analog signal paths coupling the front end core to the at least one baseband processor.

18. The MIMO radio transceiver of claim 17, further comprising a plurality of antennas operable to concurrently service at least two active communication links.

19. The MIMO radio transceiver of claim 17, wherein each in-phase and quadrature phase transmit path is impedance matched to reduce I/Q imbalance.

20. The MIMO radio transceiver of claim 17, further comprising a plurality of Analog to Digital Converters (ADCs), each servicing a respective differential signal path.

* * * * *